US007565534B2

(12) United States Patent
Starbuck et al.

(10) Patent No.: US 7,565,534 B2
(45) Date of Patent: Jul. 21, 2009

(54) NETWORK SIDE CHANNEL FOR A MESSAGE BOARD

(75) Inventors: Bryan Thomas Starbuck, Redmond, WA (US); Donald C. Weed, Jr., Sammamish, WA (US); Gail Borod Giacobbe, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 736 days.

(21) Appl. No.: 10/816,139

(22) Filed: Apr. 1, 2004

(65) Prior Publication Data

US 2005/0228983 A1 Oct. 13, 2005

(51) Int. Cl.
*H04L 29/02* (2006.01)

(52) U.S. Cl. .................................................. 713/168

(58) Field of Classification Search ....................... None
See application file for complete search history.

(56) References Cited

U.S. PATENT DOCUMENTS 5,835,084 A 11/1998 Bailey et al. ................ 345/326
5,923,846 A 7/1999 Gage et al. ............. 395/200.43
6,330,589 B1 12/2001 Kennedy .................... 709/206
6,574,233 B1 * 6/2003 Fuller et al. ................. 370/421
7,219,137 B1 * 5/2007 Smith et al. ................. 709/219
2002/0107910 A1 * 8/2002 Zhao .......................... 709/203
2002/0198943 A1 * 12/2002 Zhuang et al. .............. 709/206
2003/0115259 A1 * 6/2003 Lakshmi Narayanan .... 709/203
2004/0025020 A1 * 2/2004 Yoshimura et al. .......... 713/169
2004/0260778 A1 * 12/2004 Banister et al. ............. 709/206

OTHER PUBLICATIONS

Otsukiu, T, et al., "Data Transmission to Message Boards by Using Paper," 1999 IEEE, pp. 589-593.
Rus, D., et al., "Information Retrieval, Information Structure, and Information Agents," Intelligent Hypertext, Advanced Techniques for the World Wide Web, 1997, pp. 145-182.
Eisenzopf., J., "Making Headlines with RSS," Web Techniques, vol. 5, No. 2, Feb. 2000, pp. 67-71.
Udell, J., "New Uses for Newsgroups, Newsgroups," Web Techniques, vol. 4, No. 4, Apr. 1999, pp. 55-58.
Aydin, G., et al., "An XML-Based System for Message Creation, Delivery, and Control," Proceedings of the IASTED International Conference Information And Knowledge Sharing, Nov. 18-20, 2002, St. Thomas, U.S. Virgin Islands, pp. 241-245.
Wood, C., "Logging, Auditing and Filtering for Internet Electronic Commerce," Computer Fraud & Security, Aug. 1987, pp. 11-16.
Rosenfeld, L., et al., "Automated Filtering of Internet Postings," Online, vol. 18, No. 3, May 1994, pp. 27-30.

* cited by examiner

*Primary Examiner*—Gilberto Barron, Jr.
*Assistant Examiner*—Venkat Perungavoor
(74) *Attorney, Agent, or Firm*—Workman Nydegger

(57) ABSTRACT

The present invention allows for extending the functionality and data properties of a messaging board protocol, while maintaining support for legacy clients. A secure side channel is provided that allows functionalities and data properties not supported by a legacy protocol to be implemented. The unsecured legacy channel that uses a legacy protocol, however, is maintained. Legacy data can be sent over the legacy channel and subsequently linked up with the data properties sent over the secure side channel for extending the data properties. Because side channel is secure, a hashing and comparison of legacy data on the client and the server side allows for securing the unsecured legacy channel, thereby extending the functionality of the legacy protocol.

35 Claims, 5 Drawing Sheets

NETWORK SIDE CHANNEL FOR A MESSAGE BOARD

CROSS-REFERENCE TO RELATED APPLICATIONS

N/A

BACKGROUND OF THE INVENTION

1. The Field of the Invention

The present invention generally relates to posting messages on a message board server. More particularly, the present invention provides for extending the data properties and functionality of a legacy messaging board protocol without having to modify the legacy protocol in order to support clients with only legacy protocol capabilities.

2. Background and Related Art

Bulletin board services (BBSS) or messaging board services are systems that allow users to post and download public messages. These messaging board services normally have many different file libraries and discussion groups so that clients can communicate with one another through an on-line connection.

Typically, messaging board services can be provided as part of a large on-line network where users post messages to various groups within the message board service so that many different users can read their message. For example, a client may post a message to the message board server requesting information on a particular software program. Other users of the network service can read this message and respond by posting messages of their own, which may include such things as a comment, suggestion or an answer. Typically all of these messages are publicly available and can be read by any user.

In order to post and download messages, a client and a server need to communicate over the network through a specific protocol. The protocol may defined how data is exchanged over the server, how the server and client logically organize data being requested or provided, and authentication and the channel protection used to secure the connection. One predominate protocol used by computer clients and servers for managing message threads posted on a message board service is known as network news transfer protocol (NNTP). An NNTP client may be included as part of most any Web browser or may use a separate client program called a news reader. In any event, NNTP has become the predominate protocol for interacting with newsgroups.

Regardless of the protocol used, however, it may be desirable to extend the data properties and functionalities of a particular messaging board protocol. For example, some protocols are unsecured with no way of authenticating a user or, like NNTP, offer limited security options. With no way to authenticate or provide for a secure connection, there is no true reliability in the identity or status of an author of a message nor is there any way to protect data from being tampered with. Further, messaging board protocols are static in that data properties associated with the posting cannot easily be updated or dynamically changed. This is due to various reasons, such as the difficulty in getting a change through a standards committee. As mentioned in greater detail below, however, even if you can get a change approved, significant changes in the protocol will likely break legacy clients that don't support these changes. Still, there are a number of other reasons for extending messaging board protocols.

Typically, when displayed, messages are formatted in a conversation threading structure or tree structure. This thread structure generally includes one or more message references based on unique message identifiers. In this conversation threading scheme, related news messages are grouped together by topic. A topic or conversation generally includes a root within a hierarchy of replies or reply messages. The replies or reply messages are commonly referred to as children of the conversation root, and may include sub-topic branches.

Based on the message references and identifiers, a message thread typically is arranged so that the conversation can retain its original flow or order. Specifically, the thread can be arranged so that the conversation root is displayed first and reply messages are displayed thereafter in the order in which each is received. The thread also accommodates reply messages that stem from other reply messages and so forth. Among other things, this conversation threading allows messages to be retrieved from a server and read in a logical order.

One problem associated with the current thread structures is that a user must browse through much of a thread in order to determine whether the thread represents an ongoing conversation or a conversation that has ended. For example, some companies employ software experts who monitor and respond to questions posted on their message board server. With traditional message board protocols and clients, the expert must go through each conversation thread to determine if there is a question, and whether there has been an appropriate answer to that question. As can be appreciated, this becomes a time- and labor-intensive process. As such, it is desirable to be able to identify message threads based on some user-specified criteria, like whether a question has been sufficiently answered. Again, however, such functionality would also require the extension of typical message board protocols.

Clearly one solution to overcoming the deficiencies of current messaging board protocols would be to modify the protocol itself. There are, however, several problems associated with such a solution. For example, such modification of the protocol may require most if not all users to update their client software. Accordingly, users with legacy clients that implement the legacy protocol would not be supported with the change in data properties and functionalities. Further, there are instances where the server or client software implementation of the protocol cannot be modified in an elegant way because design choices preclude simple solutions to new problems. Accordingly, it is desirable to be able to extend the functionality and data properties offered by a legacy protocol, without having to modify the legacy protocol itself.

BRIEF SUMMARY OF THE INVENTION

In accordance with the exemplary embodiments of the present invention, the above-identified deficiencies and drawbacks of current messaging board protocols are overcome. For example, exemplary embodiments provide for a messaging board server that uses legacy protocol to post data messages for multiple clients. The functionality and data properties offered by the legacy protocol can be extended, without modifying the legacy protocol itself so as to maintain support for clients with only legacy capabilities.

Example embodiments provide for a messaging board server that receives legacy data, including a main body of a message, for posting on a messaging board over a unsecured legacy channel using a legacy protocol. The server also is capable of participating in the creation of a secure side channel for exchanging extended data properties and supporting functionalities not offered by the legacy protocol. As such, extended data may be received over the secure side channel. The extended data may include a client hash value, which is created by a client when hashing at least a portion of the legacy data, and metadata for defining extending data properties that extend the legacy protocol. Thereafter, a server hash value can be created by hashing at least a portion of the legacy data received over the unsecured legacy channel. Upon linking the legacy data to the extended data, the client hash value may be compared with the server hash value. A match of the hash values ensures the legacy data has not been altered, thereby extending the functionality of the legacy protocol by securing the unsecured legacy channel without having modified the legacy protocol.

Other example embodiments provide for extending the functionality and data properties of an unsecured legacy protocol in client capable of posting messages to a messaging board server. A secure side channel is established when exchanging extended data for supporting data properties and functionality not offered by the legacy protocol. Further, a client hash value can be created by hashing at least a portion of the legacy data. The hash value and metadata for defining extended data properties may then be sent over the secured side channel. The hash value may be used to ensure the legacy data over the unsecured channel has not been altered.

One instance in which the aforementioned hashing technique may be useful is when an implementer chooses to use two separate non-compatible authentications systems for each channel. For example, when a message is posted with extended properties, this creates the challenge of proving that the extended properties really match the uploaded message. There may be a security violation if an attacker can trick the server into associating his/her extended properties to the message instead of the appropriate extended properties. The side channel can fix this by sending its extended properties first, along with the hash of the content that will be sent over the primary channel. The server can then trust the side channel data to match the data on the primary channel because the hash matches and it was sent before the primary channel's data.

Still yet other example embodiments provide for extending the functionality and data properties of an unsecured legacy protocol in client capable receiving legacy data, including a main body of the message, from a message board server. A secure side channel can be established when exchanging extended data for supporting data properties and functionality not offered by the legacy protocol. Extended data that includes metadata for defining extended data properties and a server hash value, which is a hash of least a portion of the legacy data received over the unsecured channel, may be received over the secure side channel. After linking the legacy data and the extended data, a client hash value may be created by hashing at least a portion of the legacy data received over the unsecured channel. The client hash value can then be compared with the server hash value to ensure the legacy data has not be altered.

In still yet other exemplary embodiments, a messaging board system is provided for posting a message for multiple clients, wherein a visual representation of a message thread may be visually collapsed based upon user specified criteria for improving the user experience and efficiency of downloading messages. In such a case, an initial message from a client for posting on a message board server may be received, where the initial message has extended attributes that include a message type, visual representation data, and data identifying the type of person posting the initial message. One or more subsequent messages may be received from one or more clients for posting on the message board server. The one or more subsequent messages will have extended attributes that include a message type, visual representation data, and data identifying the type of person posting the one or more messages. The initial message can be correlated with the one or more subsequent messages for creating a message thread, which is a list of the visual representation data for the initial message and the one or more subsequent messages. User-specified message criteria important to a user for determining if the message thread can be collapsed can be received. Based on the user-specified message criteria, one or more of the extended attributes in the one or more subsequent messages can be evaluated against one or more of the extended attributes in the initial message for determining if the message thread can be collapsed into a minimized visual representation of the message thread.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for extending the data properties and functionality of a messaging board legacy protocol. The embodiments of the present invention may comprise a special purpose or general-purpose computer including various computer hardware, as discussed in greater detail below.

As previously mentioned, it is often desirable to extend the data properties and functionalities of messaging board systems. For example, the current network news transport protocol (NNTP) does not currently support data properties and functionalities such as voting, profiles, flexible authentication, etc. Accordingly, it is desirable to be able to extend the data properties and functionality of a legacy protocols (such as NNTP), without breaking support for legacy clients. The present invention provides a system for doing this by creating a side channel to handle features not supported by the first protocol. Further, the present invention allows legacy data sent over the unsecured legacy channel to be authenticated over the secure side channel, thereby extending the security functionality of the legacy protocol.

Figure 1:
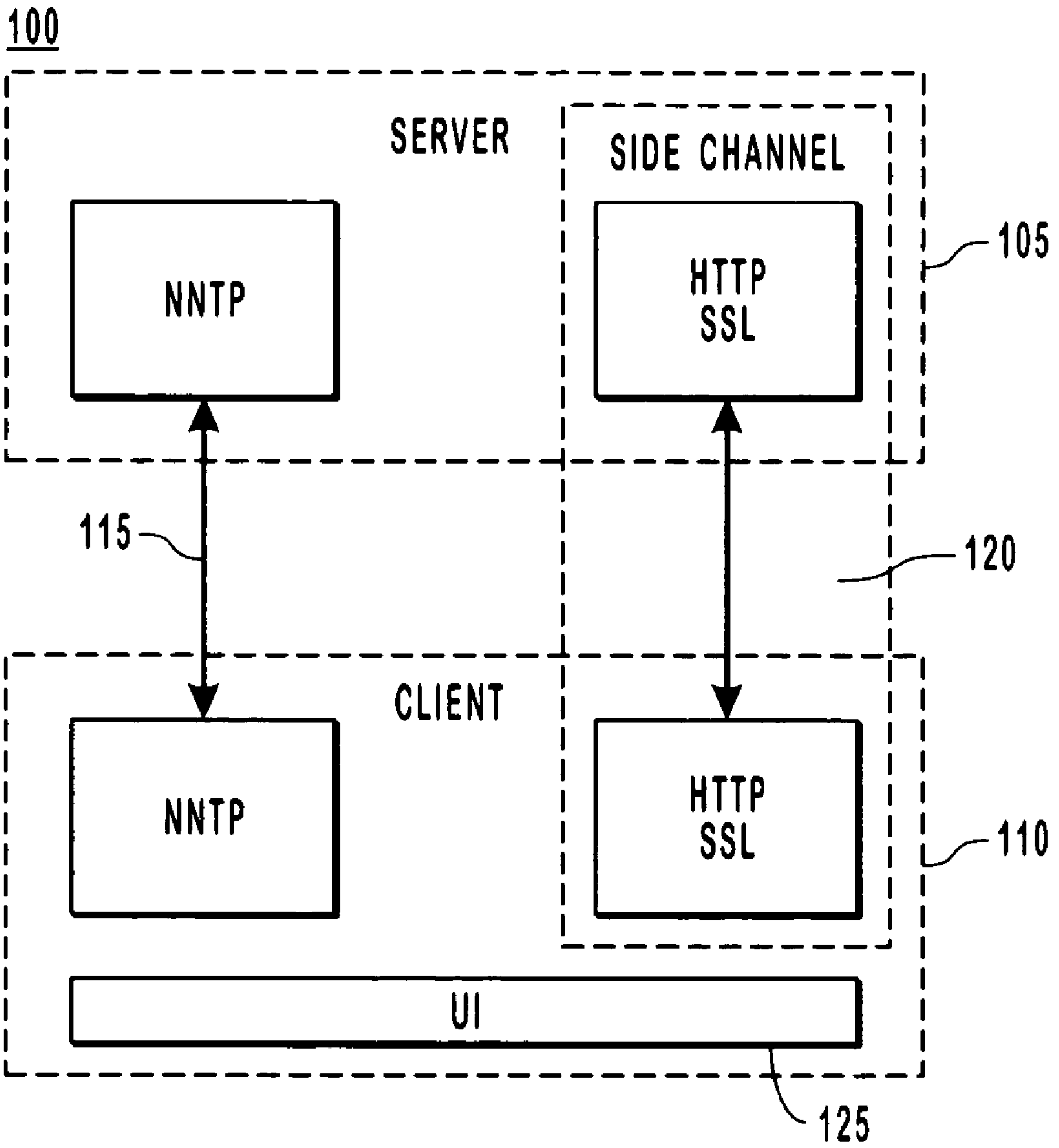
FIG. 1 illustrates a messaging board service utilizing a side channel in accordance with example embodiments of the present invention.

FIG. 1 illustrates an example of a messaging board system 100 in accordance with exemplary embodiments. The messaging board system 100 includes a server 105 and a client 110. The client 110 posts messages and downloads messages from the server 105 via a legacy protocol 115, shown here as NNTP. It should be noted, that although NNTP is the protocol that will be referred to throughout the application, other legacy message board protocols could be used to transfer the legacy data. Accordingly, the use of NNTP is meant for illustrative purposes only, and is not meant to limit or otherwise narrow the scope of the present invention.

The legacy channel 115 between the server 105 and the client 110 typically is an unsecured channel in that there is no way—or at best a very weak way—to authenticate a user or the data sent over the legacy channel 115. Although such authentication may relinquish anonymity for a user, authentication greatly reduces the chance of impersonation and offers the potential to provide additional information about a poster. Further, the security of the channel not only ensures that the data came from the author, but also ensures that others have not altered the data.

Nevertheless it is still desirable to maintain support of the legacy channel 115 to support clients 110 that are limited to the legacy protocol exclusively. Accordingly, example embodiments provide for a side channel 120, which will extend the data properties and functionality of the legacy protocol 115. For example, side channel 120 can be established between the server 105 and the client 110 with a secure protocol such as hypertext transport protocol (HTTP) using secure socket layer (SSL) protocol. Of course, other secured protocols can also be used to establish side channel 120. Accordingly, the use of HTTP over SSL is used throughout the application for illustrative purposes only and is not meant to limit or otherwise narrow the scope of the present invention.

In any event, the exemplary side channel 120 is capable of extending the data properties and functionality of the legacy channel 115 in various ways. For example, NNTP traditionally uses email addresses to identify a user that post messages to server 105. This is, however, not a guarantee of the poster's identity. Accordingly, example embodiments provide for authenticating a posters identity using side channel 120 through any one of a number of well known systems (e.g., encryption, digital signing, basic HTTP, Windows NTLM, Kerberos, X509 certificate, passport or MAC based authentication). The ability to authenticate a poster's identity, along with the other extensions of the legacy protocol through establishing the side channel 120, allows for a number of functionalities and data properties not currently supported by traditional legacy protocols 115.

For example, the authentication of a poster and the creation of side channel 120 will allow users of the message board system 100 the ability to vote on messages, conversation threads or even a poster or author of a message. Accordingly, users can easily determine their interest in the subject matter presented or the credibility of the poster.

Enhanced authentication over side channel 120 will allow for user profiling, which can give a reliable indication as to the poster's identity, integrity, number of postings or a length of posting messages, a ranking of the poster (e.g., expert, guru, novice, etc.), etc. Accordingly, authentication allows users who verify their identities to add legitimacy to their claim of a status such as an expert, guru, employee, etc. Although they relinquish anonymity while acting through their authenticated identity, this greatly reduces the chance of impersonation and offers the potential to provide additional information about a poster, perhaps a link to a personal or informational web page.

As will be discussed in greater detail below, authentication can also provide many other valuable features in order to extend the legacy protocol 115. Unauthenticated users should still be allowed to participate in the message board service 100, but without the ability to interact with the enhanced features. The new categories and ratings, however, can be visible on the client provided that the client's 110 user interface (UI) 125 supports these features.

Other example embodiments allow for securing the unsecured channel of the legacy protocol through a hashing type mechanism. For example, embodiments provide that the client 110 hashes some of the content sent over the unsecured channel 115 and sends the hash over the secure channel 120. The server 105 then hashes the content received over the unsecured channel 115 and compares the hash it generates to the one received over the secure channel 120. Based on the comparison, the server 105 determines if the message posted over the unsecured channel 115 has been altered in transit. Of course, a similar reverse process can be performed when downloading messages from the server 105 to the client 110. In any event, this mechanism allows for a virtual securing of the unsecured channel, thereby extending the security functionality of the legacy protocol 115.

As previously mentioned, another instance in which the aforementioned hashing technique may also be useful is when an implementer chooses to use two separate non-compatible authentications systems for each channel 120, 115. For example, when a message is posted with extended properties, this creates the challenge of proving that the extended properties really match the uploaded message. There may be a security violation if an attacker can trick the server 105 into associating his/her extended properties to the message instead of the appropriate extended properties. The side channel 120 can fix this by sending its extended properties first, along with the hash of the content that will be sent over the unsecured channel 115. If the hashes match, the server can then trust the side channel 120 data to correspond to the data on the unsecured channel 115 because the hash matches and it was sent before the primary channel's data.

It should be noted, that the above hashing techniques for securing an un-secure side channel and for authenticating extended data properties may extend to other types of network servers. Accordingly, the aforementioned hashing using a message board server is an example of using the hashing technique to extend the functionality of a network server that utilizes a legacy protocol. Accordingly, the aforementioned usage of the hashing technique for a messaging board server is used for illustrative purposes only and is not meant to limit or otherwise narrow the scope of the present invention.

As previously, mentioned, other example embodiments provide for extending data properties of the legacy protocol 115. Metadata within the extended data sent over the secure side channel 120 can be transferred back and forth between the server 105 and the client 110 to update, post, and view these data properties. The metadata, and other extended data transferred or communicated over the secure side channel 120 may be in the form of an extensible markup language (XML) or any other well known and similar format.

Regardless of the data format used, the creation of the side channel 120 provides for both static and dynamic metadata used to extend the data properties of the legacy protocol 115. For example, example embodiments provide for static metadata transferred over the side channel 120 that can define a message or thread type. Typical message types may include an indication that the message is a question, comment, suggestion, answer, unanswered question, an unanswered suggestion, etc. Similarly, a thread type may be categorized as a general post, suggestion, suggestion with company response, open question, closed question, etc. Example embodiments provide that these message and conversation thread types can be visually indicated by icons or text in a separate column on user interface 125. Such indications will offer a quick overview of the basic nature of the message or thread and provide the ability to sort by type.

Examples of dynamic data may include voting properties, wherein users of the messaging board service 100 can vote on such things as a rating for a message, a rating of a thread, a ranking of an author or poster, or other similar voting or opinions that may be useful to other users. The voting UI may have a read note that would allow a user to indicate that a message, thread, author, or other, was helpful, not helpful, helpful but need more information, or the answer, etc. Of course, any other type of voting or sliding scale could be used, such as a five-star ranking or rating system. Of course any other similar scaled voting or scoring is possible, and as such the above mentioned methods for voting are used for illustrative purposes only and are not meant to limit or otherwise narrow the scope of the present invention.

Other example embodiments provide that the voting mechanisms may be different for different users. For example, a normal user may be able to specify a message as simply helpful, not helpful or possibly SPAM. The thread owner or the person who started the thread (usually by posting a question to the new group) may, however, have more voting options. For example, the thread owner may be able to categorize a response as not helpful, helpful but more information is needed (a partial answer), or as the answer to the original question. Similar to the thread owner an expert or employee may also be offered a menu option to label a response as the answer to a question. This would allow the maintenance for the messaging service for closing an open question in the event the thread owner is absent, or simply to mark a posting as worthwhile. In any event, example embodiments provide that the expert, employee, or even the original thread owner, should usually become authenticated before their special identity will be recognized. Moreover, a list of company employees may be maintained on server 105, which may be useful for suggestion messages and could have other applications as well.

Regardless of the voting options, example embodiments provide that if a user has authenticated the vote can be transmitted to the server 105. The votes may then be tabulated on the server to provide feedback as to the consensus of the value of the information in the message, of the author, or the like. Because this metadata is capable of change, i.e., dynamic in nature, the metadata can be periodically refreshed from the server 105. Accordingly, as voting accumulates and ratings and rankings change, the client 110 may periodically request a refresh of the metadata from the server 105. Updated metadata can show, e.g., that a question has been answered, or an existing post has been highly rated. The user interface 125 may display the updated data, and potentially any subsequent messages or portions thereof that were not previously downloaded. Such data properties provided by the metadata are not currently supported by legacy protocol, such as NNTP.

The above mentioned updated information example embodiment may be optimized for greatest efficiency and scalability. For example, a client 110 when requesting for updated information from server 105 may potentially send a timestamp indicating the client's most recently received updated metadata. Accordingly, the server 105 can evaluate the extended data including the metadata that has subsequently been updated, and thus send only that extended data that has changed. Of course, other well known methods for optimizing downloading efficiency can also be utilized, and therefore the above example is used for illustrative purposes only and is not meant to limit or otherwise narrow the scope of the present application. Although other legacy protocols, such as NNTP, used timestamps to determine what messages had previously been received, there was no evaluation of what extended data had changed because these legacy protocols didn't support such data properties.

Figure 2:
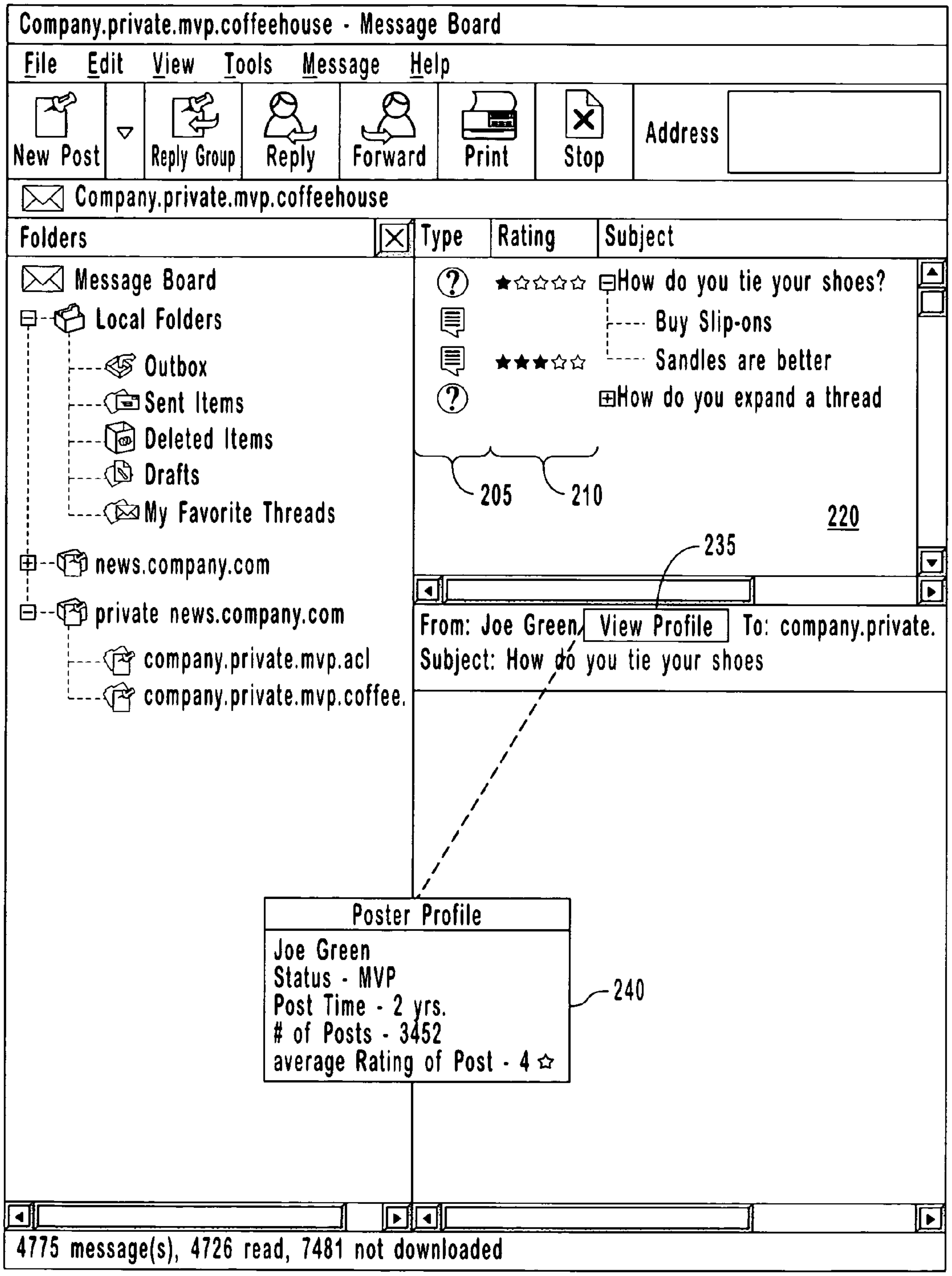
FIG. 2 illustrates a user interface that can utilize the various data properties transmitted over the side channel in accordance with exemplary embodiments.

FIG. 2 illustrates an example of a user interface 200 to show various data properties that can be extended in accordance with example embodiments. For example, as shown in the list view of messages 220, a message and/or thread can have a rating, which is previously described can be determined by the express opinions of message board participates. A particular message can be highlighted in this column as being particularly useful, not useful, useful but need more info, specifically the answer to the original question, etc. Also as previously mentioned, another possibility might be to allow participants to categorize a particular message as SPAM and such information displayed in column 210.

FIG. 2 also shows in column 205, a message can be represented as a question, comment, suggestion, answer, unanswered question, or unanswered suggestion. Similarly, a thread may be categorized and displayed as general, suggestion, suggestion with employee response, open question, closed question, etc. These types may be indicated by icons or text in a separate column 205, offering a quick overview of the basic nature of the message or thread and providing the ability to sort by type.

Also shown in user interface 200 is the view profile button 235, which when activated can show the poster profile window 240. Alternatively, the view profile 235 button (or even the view profile window 240) may be a hyperlink to a Web page that will provide more information on the poster. The information may include details about a person, e.g., their integrity, how long they have been posting, the number of posts made, the average rating of posts for the particular user, etc.

Figure 3A:
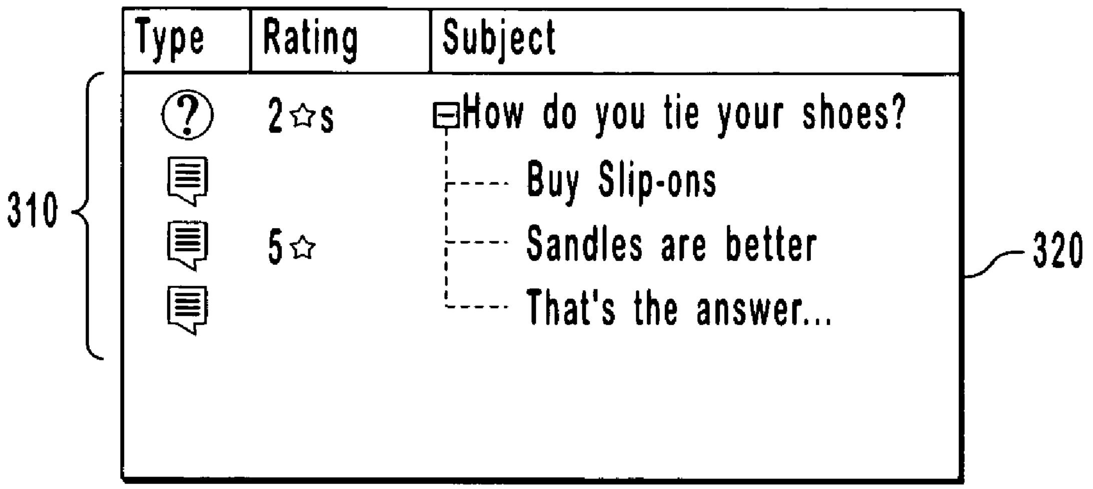
FIGS. 3*a* and 3*b* illustrate an example of how a message thread can be visually collapsed in accordance with exemplary embodiments.
Figure 3B:
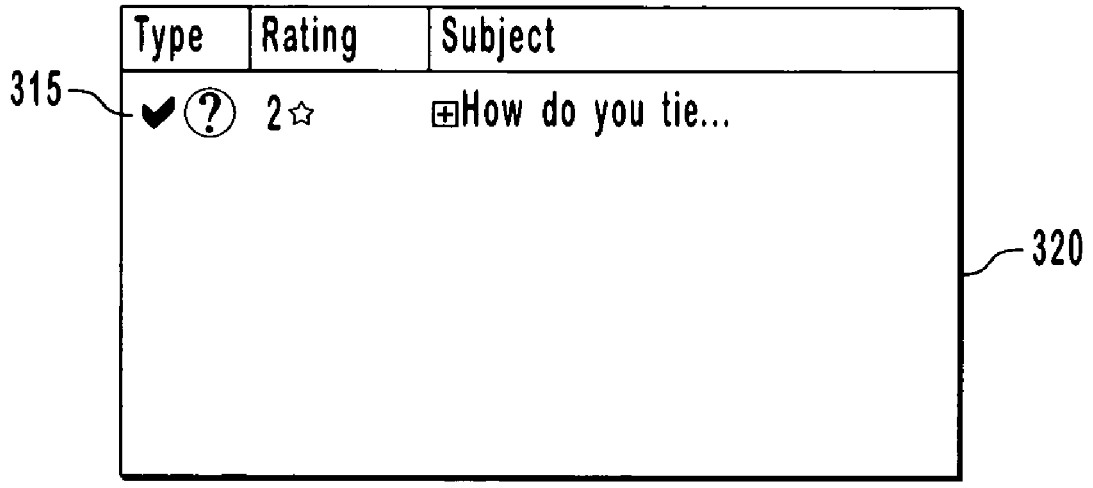

In accordance with other example embodiments, the side channel previously discussed allows for extending the functionality of the legacy protocol by providing a filter mechanism for visually collapsing message threads based one or more of the aforementioned extended data properties and user-specified criteria. For example, as shown in FIG. 3*a*, message pane 320 contains a message thread 310 with the root message as a question. Based on the extended data properties and user-specified criteria, the message thread can be visually collapsed into a minimized visual representation 315 (and possibly a re-typing of the message thread, such as from a question to an answered question), as shown in FIG. 3*b*. For instance users of the messaging board service such as experts and employees may wish to allow for quick location of messages still in need of a response. As such, the user-specified message criteria may simply be that if a thread with a question as the root has been rated by the thread owner as receiving a satisfactory response, then the filter should collapse the thread.

As an alternative to thread re-typing, the user-specified message criteria may be to show only unanswered threads. Accordingly, this embodiment would allow for a minimal visual representation 315 collapsing the entire thread 310 to display nothing. As such, the term minimal visual representation is meant to include the null display.

Of course, any number of user-specified message criteria may be used in evaluating whether a thread should be visually collapsed. Accordingly, the above-identified example of hiding message threads that have already received satisfactory responses is meant for illustrative purposes only and not meant to limit or otherwise narrow the scope of the present invention. Further, as one would recognize, this visual collapsation can be done on either the server or client side of the messaging board system.

The present invention may also be described in terms of methods comprising functional steps and/or non-functional acts. The following is a description of acts and steps that may be performed in practicing the present invention. Usually, functional steps describe the invention in terms of results that are accomplished whereas non-functional acts describe more specific actions for achieving a particular result. Although the functional steps and non-functional acts may be described or claimed in a particular order, the present invention is not necessarily limit to any particular ordering or combination of acts and/or steps.

Figure 4:
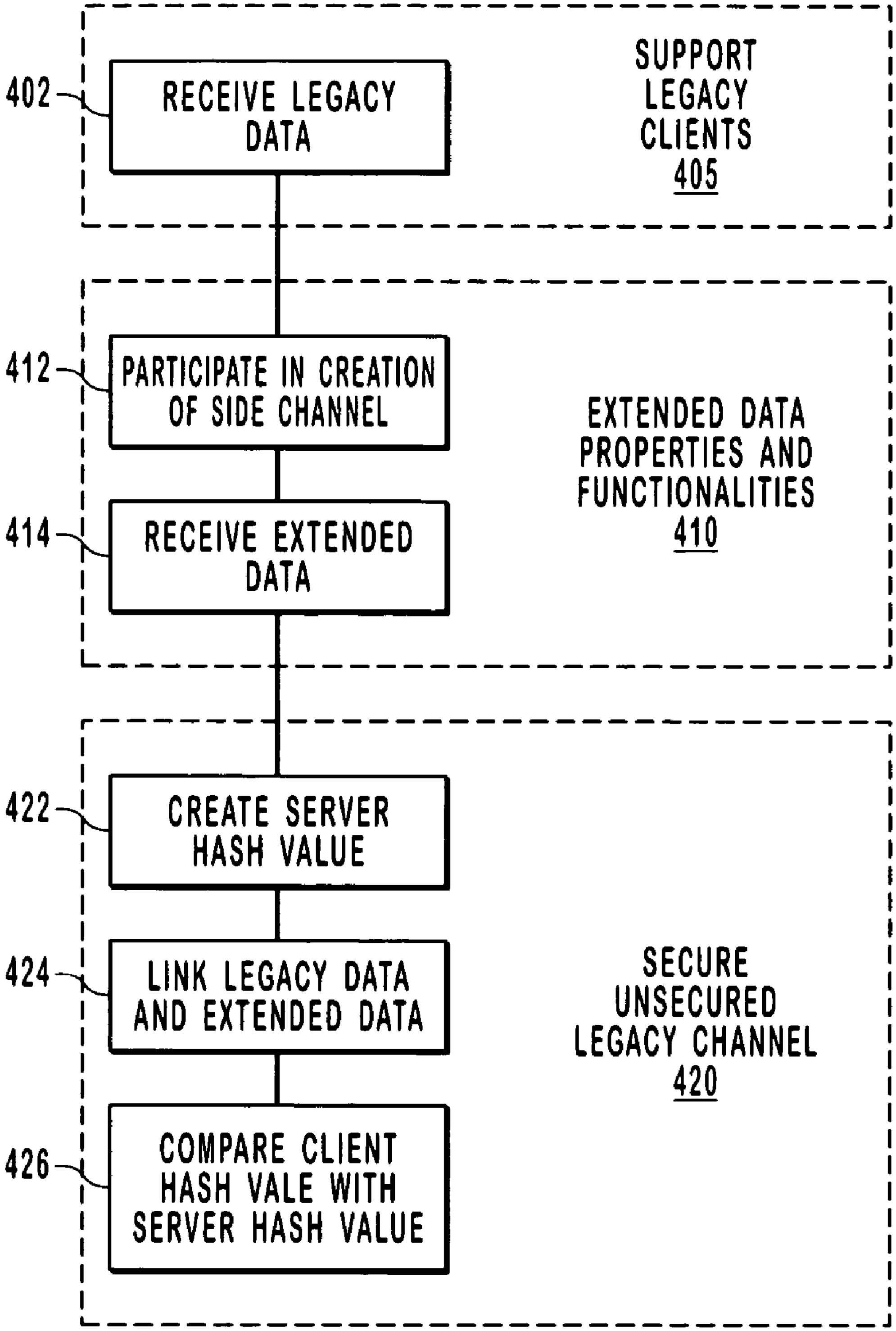
FIG. 4 shows example acts in the steps for extending the functionality and data properties offered by a legacy protocol in accordance with example embodiments.

FIG. 4 illustrates exemplary steps and acts for extending the functionality and data property offered by a legacy protocol for messaging board system, without modifying the legacy protocol so as to maintain support for clients with only legacy capabilities. A step for supporting 405 legacy clients may include the act of receiving 402 legacy data, including a main body of data message, for posting on a message board server over an unsecured legacy channel using a legacy protocol. Further, a step for extending 410 data properties and functionalities may include the act of participating 412 in the creation of a secure side channel and the act of receiving 414 over the secure side channel extended data. The extended data may include a client hash value, created by a client when hashing at least a portion of the legacy data. As previously mentioned, the client hash value may hash any portion of the legacy data, e.g., the main body of the data message. Moreover, the extended data may include metadata for defining extended data properties that extend the legacy protocol.

A step for securing 420 the unsecured legacy channel may include an act of creating 422 a server hash value by hashing at least a portion of the legacy data received over the unsecured legacy channel, an act of linking 424 legacy data and the extended data, and an act of comparing 426 the client hash value with the server hash value to ensure that the legacy data has not been altered for extending the functionality of the legacy protocol.

As previously mentioned, data properties provided by the metadata are not currently supported by legacy protocol, such as NNTP. The metadata within the extended data properties may include a type of message chosen from one of a question, comment, suggestion, answer, unanswered question or an answered suggestion. Further, the metadata may include a view profiler, which has details about a user who posted the legacy data including at least one of the user's integrity or how long the user has been posting messages to the message board server. Also, the metadata may be periodically updated based upon voting input from one or more users. The voting input from the one or more users may be an opinion rating the messages as one of useful, specifically the answer to an original question, or SPAM. The opinion rating could also be a scaled scoring such as a certain number of stars out of a total number of stars. Moreover, the voting input from the one or more users may be a ranking of an author that posted the main body of the data message within the legacy data. The author may be classified as an expert, guru, novice, apprentice, or company employee. Typically, the user will be authenticated over the secure side channel before being allowed to update the metadata within the extended data properties based on voting input. The authentication may be any form of encryption, digital signing, basic HTTP, Windows NTLM, Kerberos, X509 certificate, passport or MAC based authentication.

Also as previously mentioned, the legacy protocol may be NNTP and a side channel protocol may be HTTP using SSL to secure the side channel. Further, the message format for the data received over the secure side channel may be XML.

Other example embodiment provide for acts of extending the functionality and data properties offered by a legacy protocol when a client posts a message to message board server utilizing the legacy protocol. For example, the method may include the act of posting legacy data, including the main body of the message on a messaging board over an unsecured legacy channel using a legacy protocol that supports legacy clients. An act of establishing a secured side channel may also be provided when exchanging extended data for supporting data properties and functionality not offered by the legacy protocol. Moreover an act of creating a client hash value by hashing at least a portion of the legacy data, and an act of sending over the secured side channel extended data that includes metadata may also be provided for defining extended data properties in the client hash value to make sure that the legacy data over the unsecured channel has not been altered.

Other example embodiments provide for another method of extending the functionality and data properties of a legacy protocol when a client requests posted messages from a message board server utilizing the legacy protocol. The method may include the act of receiving legacy data, including a main body of a message from a messaging board server to be received over an unsecured legacy channel using a legacy protocol that supports legacy clients. Further, the method may include the act of establishing the secure side channel when exchanging extended data for supporting data properties and functionality not offered by the legacy protocol. An act of receiving over the secure side channel extended data is also provided. The extended data may include metadata for defining extended data properties and a server hash value, which is a hash of at least a portion of the legacy data received over the unsecured legacy channel. Moreover, an act of linking the legacy data and the extended data is provided, and an act of creating a client hash value by hashing at least a portion of the legacy data received over the unsecured channel is also provided. To ensure the legacy data has not been altered, an act of preparing the client hash value with the server hash value is also provided.

Other example embodiments provide for the ability to selectively choose the metadata that will be requested from the messaging board server. For example, only those extended attributes that change over time and have subsequently changed since the last request from the client, may be requested from the message board server. This may possibly be in the form of a timestamp, or any other well known method for requesting updated data.

Other example embodiments provide for a method of visually collapsing messages within a message thread based upon user-specified criteria for improving the user experience and efficiency of downloading a message. The method may include the acts of receiving an initial message from a client for posting on a message board server. The initial message having extended attributes that include a message type, visual representation data, and data identifying the type of person posting the initial message. Further, the method may include the act of receiving one or more subsequent messages from one or more clients for posting on a message board server. Similar to the initial message, the one or more subsequent messages may have extended attributes that include a message type, visual representation data, and data identifying the type of person posting the one or more messages. Further, the method may include the act of correlating the initial message with the one or more subsequent messages for creating a message thread, which is a list of the visual representation data for the initial message and the one or more subsequent messages. When determining if the message thread can be collapsed, the method may include the act of receiving user-specified message criteria important to a user. Based on the user-specified message criteria, an act of evaluating one or more of the extended attributes in the one or more subsequent messages against one or more of the extended attributes in the initial message is provided for determining if the message thread can be collapsed into a minimized visual representation of the message tree.

The minimized visual representation can possibly be simply a non display of any information about the thread. Further, the message type for the initial message and the one or more subsequent messages can be chosen from one of a question, comment, suggestion, answer, an answered question or an answered suggestion. Moreover, the extended attributes for the initial message and the one or more subsequent messages may further include profiler data, which has details about a user who posted the message including at least one of the user's integrity or how long the user has been posting messages to the message board server. In addition, the extended attributes for the initial message and the one or more subsequent messages may further include extended data properties that are periodically updated based on voting input from one or more users, and wherein a client periodically makes a request for the extended data properties that have changed. The voting input from the one or more users may be an opinion rating the message as one or more of useful, not useful, useful but need more information, specifically the answer to an original question, or spam.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 5:
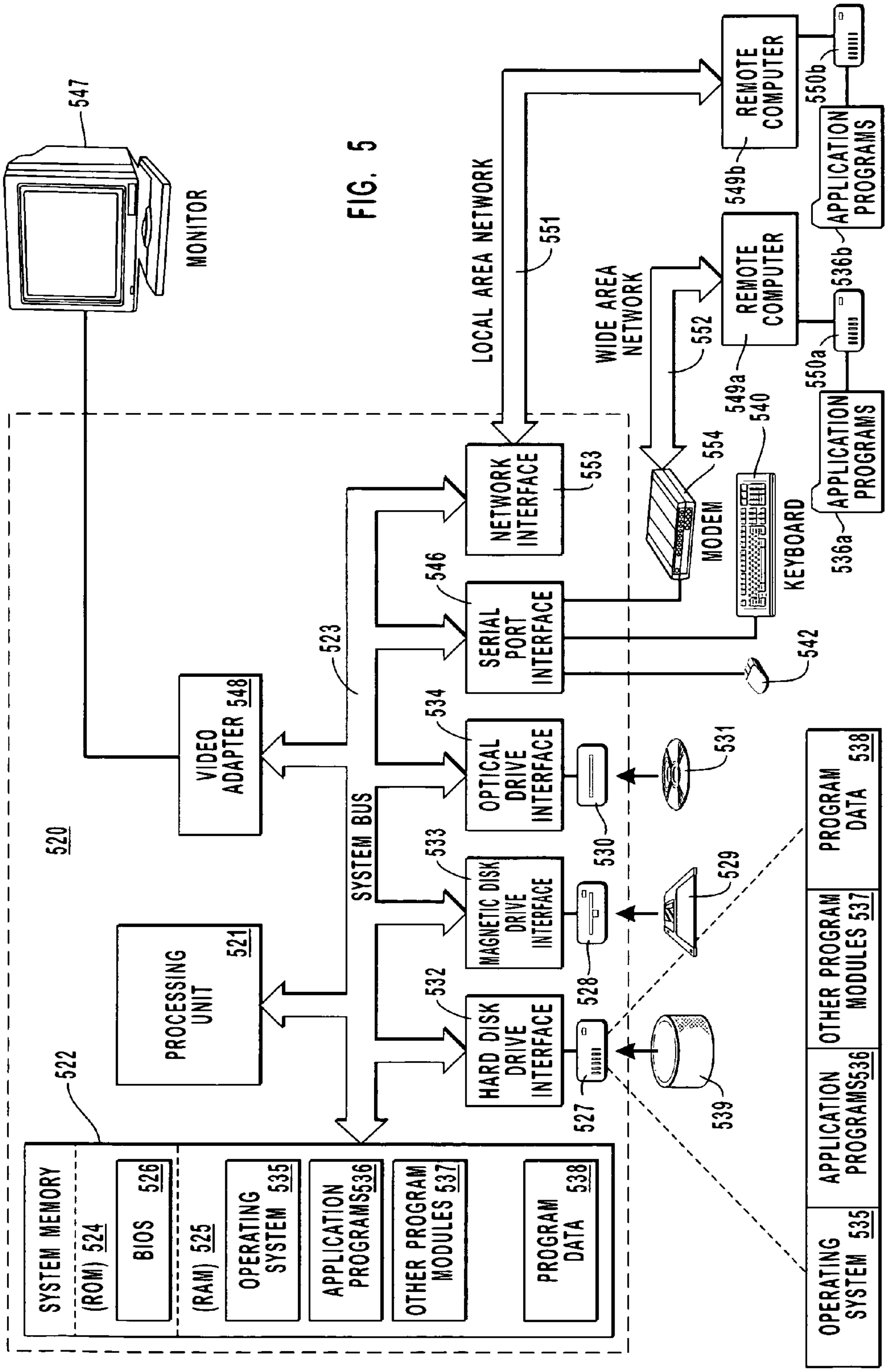
FIG. 5 illustrates an example system that provides a simple operating environment for the present invention.

FIG. 5 and the following discussion are intended to provide a brief, general description of a suitable computing environment in which the invention may be implemented. Although not required, the invention will be described in the general context of computer-executable instructions, such as program modules, being executed, by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CD-ROM or other optical media. Optical disc drive 530 is one example of an optical media recorder. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 539, magnetic disk 529, optical disc 531, ROM 524 or RAM 525, including an operating system 535, one or more application programs 536, other program modules 537, and program data 538. A principal may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549*a* and 549*b*. Remote computers 549*a* and 549*b* may each be another personal computer, a server, a router, a network PC, a peer device or other common network node, and typically include many or all of the elements described above relative to the computer 520, although only memory storage devices 550*a* and 550*b* and their associated application programs 536*a* and 536*b* have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

Accordingly, the present invention may be practiced in a computer that is connected to an optical media recorder over a computer network. In some new systems, system bus 523 is encapsulated and sent across a new transport, such as a TCP/IP network. For example, ISCSI (Internet SCSI or Internet Small Computer Systems Interface) is one fairly well-known implementation of a TCP/IP-based protocol for establishing and managing connections between IP-based storage devices, hosts, and principals.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a messaging board server using a legacy protocol to post data messages for multiple clients, a method of extending the functionality and data properties offered by the legacy protocol, without modifying the legacy protocol so as to maintain support for clients with only legacy capabilities, the method comprising the acts of:

receiving legacy data, including a main body of a data message, for posting on a messaging board over an unsecured legacy channel using a legacy protocol for supporting legacy clients;

participating in the creation of a secure side channel for exchanging extended data properties and supporting functionalities not offered by the legacy protocol;

receiving over the secure side channel extended data that includes a client hash value, created by a client when hashing at least a portion of the legacy data, and metadata for defining extended data properties that extend the legacy protocol;

creating a server hash value by hashing at least a portion of the legacy data received over the unsecured legacy channel;

linking the legacy data and the extended data; and comparing the client hash value with the server hash value to ensure that the legacy data has not been altered for extending the functionality of the legacy protocol by securing the unsecured legacy channel without having modified the legacy protocol.

2. The method of claim 1, wherein the metadata within the extended data properties includes a type of message chosen from one of a question, comment, suggestion, answer, an answered question or an answered suggestion.

3. The method of claim 1, wherein the metadata within the extended data properties includes profiler data, which has details about a user who posted the legacy data including at least one of the user's integrity or how long the user has been posting messages to the message board server.

4. The method of claim 1, wherein at least a portion of the metadata within the extended data properties is periodically updated based on voting input from one or more users.

5. The method of claim 4, wherein the voting input from the one or more users is an opinion rating the message as one or more of useful, specifically the answer to an original question, or spain.

6. The method of claim 4, wherein the voting input from the one or more users is an opinion rating that is a scaled scoring.

7. The method of claim 4, wherein the voting input from the one or more users is a ranking of an author that posted the main body of the data message within the legacy data as an expert, guru, novice, apprentice, or company employee.

8. The method of claim 4, wherein the voting input for the one or more users is a scaled score ranking of an author that posted the main body of the data message within the legacy data.

9. The method of claim 4, wherein the one or more users are authenticated over the secure side channel.

10. The method of claim 1, wherein the authentication of the one or more users are based on one or more of an encryption, digital signing, basic HTTP, Windows NTLM, Kerberos, X509 certificate, Passport or MAC based authentication.

11. The method of claim 1, wherein the legacy protocol is network news transport protocol, and wherein the side channel protocol is hypertext transport protocol using secure socket layer protocol to secure the side channel.

12. The method of claim 11, wherein a format for the extended data received over the secure side channel is extensible markup language.

13. In a client that posts messages to a messaging board server using a legacy protocol, a method of extending the functionality and data properties offered by the legacy protocol without modifying the legacy protocol so as to maintain support for clients with only legacy capabilities, the method comprising the acts of:

posting legacy data, including a main body of a message, on a messaging board over an unsecured legacy channel using a legacy protocol that supports legacy clients;

establishing a secure side channel when exchanging extended data for supporting data properties and functionality not offered by the legacy protocol;

creating a client hash value by hashing at least a portion of the legacy data; and sending over the secure side channel extended data that includes metadata for defining extended data properties and the client hash value; and correlating the legacy data sent on the unsecured legacy channel with the extended data sent over the secure side channel to ensure that the legacy data over the unsecured legacy channel has not been altered.

14. The method of claim 13, wherein the metadata within the extended data properties includes a type of message chosen from one of a question, comment, suggestion, answer, an answered question or an answered suggestion.

15. The method of claim 13, wherein the metadata within the extended data properties includes profile data, which has details about a user of the client that posted the legacy data including at least one of the user's integrity or how long the user has been posting messages to the message board server.

16. The method of claim 13, wherein at least a portion of the metadata within the extended data properties includes voting input from a user of the client that posted the legacy data.

17. The method of claim 16, wherein the voting input from the user is an opinion rating the message as one or more of useful, not useful, useful but need more information, specifically the answer to an original question, or spain.

18. The method of claim 16, wherein the voting input from the user is an opinion rating that is a scaled scoring.

19. The method of claim 16, wherein the voting input for the one or more users is a scaled score ranking of a user that posted the main body of the data message within the legacy data.

20. The method of claim 16, wherein the user is authenticated over the secure side channel.

21. The method of claim 20, wherein the authentication of the user is based on one or more of an encryption, digital signing, basic HTTP, Windows NTLM, Kerberos, X509 certificate, Passport or MAC based authentication.

22. The method of claim 13, wherein the legacy protocol is network news transport protocol, and wherein the side channel protocol is hypertext transport protocol using secure socket layer protocol to secure the side channel.

23. The method of claim 22, wherein a format for the extended data sent over the secure side channel is extensible markup language.

24. In a client that receives messages from a network server using a legacy protocol, a method of extending the functionality and data properties offered by the legacy protocol without modifying the legacy protocol so as to maintain support for clients with only legacy capabilities, the method comprising the acts of:

receiving legacy data, including at least one main body of a message, from a network server to be received over an unsecured legacy channel using a legacy protocol that supports legacy clients;

establishing a secure side channel when exchanging extended data for supporting data properties and functionality not offered by the legacy protocol;

receiving over the secure side channel extended data that includes metadata for defining extended data properties and a server hash value, which is a hash of at least a portion of the legacy data received over the unsecured legacy channel;

linking the legacy data and the extended data;

creating a client hash value by hashing at least a portion of the legacy data received over the unsecured channel; and comparing the client hash value with the server hash value to ensure that the legacy data has not been altered.

25. The method of claim 24, wherein the network server is a message board server, and the metadata within the extended data properties includes a type of message chosen from one of a question, comment, suggestion, answer, an answered question or an answered suggestion.

26. The method of claim 25, wherein the network server is a message board server, and the legacy data received over the unsecured legacy channel includes a conversation thread that has at least one root message that is a question and one or more other messages, and wherein the metadata includes a type of message for the other messages chosen from one of a question, comment, suggestion, answer, an answered question or an answered suggestion.

27. The method of claim 26, wherein the client visually collapses the conversation thread based on user-specified criteria and the extended data properties received for the root message and the other messages.

28. The method of claim 24, wherein the network server is a message board server and the metadata within the extended data properties includes profiler data, which has details about a user who posted the legacy data including at least one of the user's integrity or how long the user has been posting messages to the message board server.

29. The method of claim 24, wherein the network server is a message board server and the at least a portion of the metadata within the extended data properties is periodically updated based on voting input from one or more users, and wherein the client periodically makes a request for the extended data properties that have changed.

30. The method of claim 29, wherein the voting input from the one or more users is an opinion rating the message as one or more of useful, not useful, useful but need more information, specifically the answer to an original question, or spain.

31. The method of claim 29, wherein the opinion rating is a scaled scoring.

32. The method of claim 29, wherein the voting input from the one or more users is a ranking of an author that posted the main body of the data message within the legacy data as an expert, guru, novice, apprentice, or company employee.

33. The method of claim 24, wherein the network server is a message board server, the legacy protocol is network news transport protocol, and wherein the side channel protocol is hypertext transport protocol using secure socket layer protocol to secure the side channel.

34. The method of claim 33, wherein a format for the extended data received over the secure side channel is extensible markup language.

35. The method of claim 25, wherein:

the secure side channel provides for dynamic and static metadata to be transferred therein, and receiving over the secure side channel extended data includes receiving both dynamic and static metadata, wherein the static metadata defines a thread type as one or more types selected from a group consisting of question, comment, suggestion, answer, unanswered question, and answered question, and wherein the dynamic metadata defines voting properties allowing users of the message board server to vote on ratings of one or more types selected from a group consisting of a message rating, a thread rating, a rating of an author;

the method further comprises:

using the dynamic metadata to provide one or more ranking options to one or more users of the message board server, wherein providing one or more ranking options includes providing different voting mechanisms to different categories of users and such that a normal user is provided with a subset of ranking options and a thread owner is provided with additional voting options; and receiving ranking information from the one or more users of the message board server in accordance with the voting information specified in the dynamic metadata.

* * * * *